Jan. 2, 1968    T. R. STENGEL    3,361,497

MECHANICAL DEVICE

Filed July 15, 1965

Inventor:
Theodore R. Stengel
By Mueller, Aichele & Rauner
Attys

United States Patent Office 3,361,497
Patented Jan. 2, 1968

3,361,497
MECHANICAL DEVICE
Theodore R. Stengel, Valparaiso, Ind., assignor to McGill Manufacturing Company, Inc., Valparaiso, Ind., a corporation of Indiana
Filed July 15, 1965, Ser. No. 472,175
5 Claims. (Cl. 308—187.2)

ABSTRACT OF THE DISCLOSURE

This sealing device has spaced indentations in the face which open to one annular edge of the seal. The seal is inserted in corresponding retaining grooves in the inner and outer races of an anti-friction bearing that has an opening in the raceway for relubrication of the anti-friction elements during service. During relubrication the pressure that builds upon in the raceway is vented at the indentations when the seal face is pressed against the outer wall of the grooves by the relubrication pressure.

---

This invention pertains generally to a seal for bearing assemblies, and more particularly to a seal for anti-friction bearing assemblies which may be re-lubricated while in service without disturbing the seal in the bearing structure.

In anti-friction bearings which do not require relubrication of the bearing internally, stamped annular rings contained between two opposing grooves such as described in William H. Koss Patent No. 3,140,129 assigned to the assignee of this application, provide excellent seals for retaining the lubricant in the bearing assembly. However, where it is necessary to re-lubricate the bearings internally while in service the stamped annular ring seals are generally inadequate, for the internal pressure within the bearing increases as the lubricant is added causing the ring seal to move axially until it is in contact with the side walls of the confining grooves. With such an increase in pressure, the ring is forced against the wall of the groove in a tight seal which permits the pressure to build up without any escape until the seal is displaced or "blown" from the bearing.

It is one object of this invention to provide an improved seal for an anti-friction bearing.

It is another object of this invention to provide an improved seal for an anti-friction bearing that permits re-lubrication of the bearing while in service.

One feature of the invention is the provision of a sealed bearing assembly that can be re-lubricated while in service, and which has anti-friction elements having relieved portions in the seal face opening to an annular edge of the bearing assembly, so that re-lubrication pressures can be vented at the relieved areas on the seal at the bearing raceway during bearing re-lubrication.

Another feature of this invention is the provision of an anti-friction bearing assembly including an inner race and an outer race adapted to rotate freely relative to one another, having an opening in the raceway for re-lubrication of the anti-friction elements during service, and having at least one thin annular seal with spaced indentations in the face which open to one annular edge of the seal. The seal is inserted into corresponding retaining grooves in the inner and outer races of the bearing and permits re-lubrication pressures to be vented at such indentations and from the bearing raceway during re-lubrication thereof when the seal face is pressed against the outer wall of the groove by the re-lubrication pressure.

The invention is illustrated in the accompanying drawings in which.

In accordance with one embodiment of this invention, the anti-friction roller bearing assembly includes an inner race ring and an outer race ring forming a raceway for receiving a series of rolling elements. Radial lubrication holes extend through the outer race ring for re-lubricating the bearing while in service. An inner portion of the outer race ring and an outer portion of the inner race ring have grooves formed around their opposite annular faces or portions near the axial end of each. Circular sealing rings are inserted in and retained by the opposite or nearly oppositely disposed grooves. The sealing rings each have an outer peripheral edge that fits into the grooves in the outer race ring and an inner annular edge, which defines the bore of the seal and fits into the groove in the inner race ring. The edges of the seal define the radial face thereof. On one face of the seal, spaced indentations open to the inner annular adge of the seal that defines the bore thereof. On the opposing face of the seal there are similar indentations in a spaced relation to the former. When re-lubricating the bearing, the increased pressure at the anti-friction elements causes the seals to move axially and outwardly, pressing the seal faces against the outer walls of the grooves, and thereby tending to seal the bearing against internal pressure. The indentations on the seal faces, however, provide passages between the walls of the grooves and the seal face to prevent the sealing action and to permit the lubricant to bleed around the sealing ring at the indentations to relieve the internal re-lubrication pressures and prevents displacing or "blowing" of the seal.

In another application the bearing structure has only one seal, with the unsealed axial end being mounted in a housing. The bearing is re-lubricated by forcing lubricant into the housing and then into the bearing raceway through the unsealed axial end. The venting action of the seal is the same as previously described.

Figure 1:
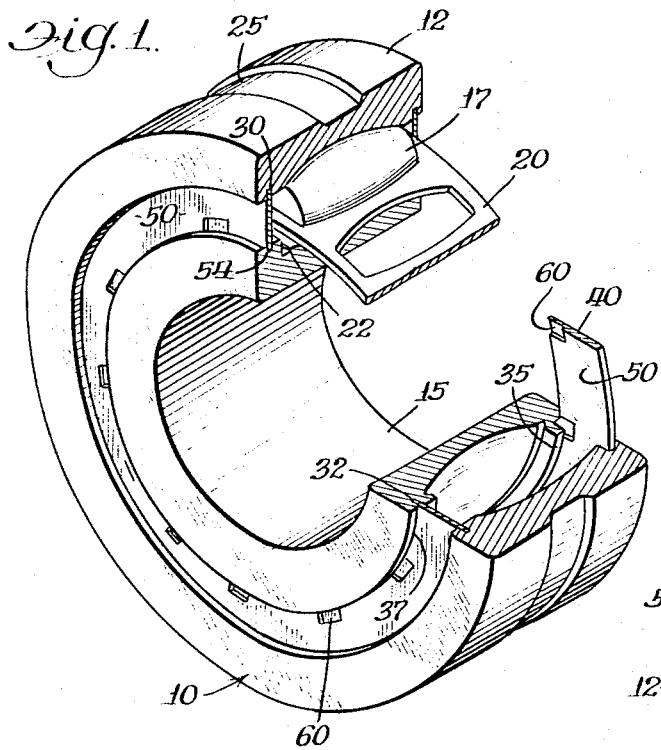
FIG. 1 is a perspective view, partly in section, showing a roller bearing assembly and seal structure in accordance with this invention.
Figure 2:
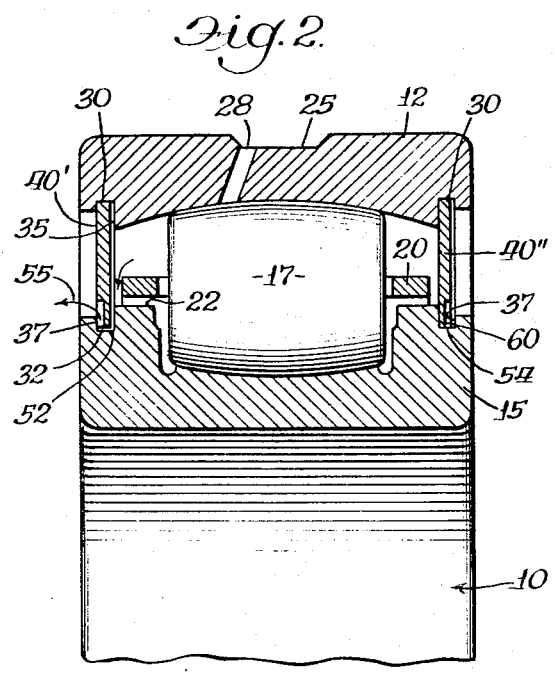
FIG. 2 is a fragmentary cross-sectional view of the bearing assembly of FIG. 1.

Referring specifically to the drawings, FIGS 1 and 2 show a separable type, spherical roller bearing in which the rollers are positioned by a retension cage or segmented retainer. The bearing assembly 10 includes an outer race ring 12 and an inner race ring 15, coaxially mounted to form a raceway between the respective outer and inner faces thereof. A series of rolling elements 17 are positioned in the raceway by segmented retainer 20. the retainer 20 rides on and is supported by the inner lands 22 of the inner race ring 15. A lubrication groove 25 is provided around the outer surface of outer race ring 12, and two lubrication apertures or oil holes 28, spaced 180° apart are located in the groove 25 and open into the raceway for supplying lubricant to the raceway and anti-friction bearing elements.

Figure 3:
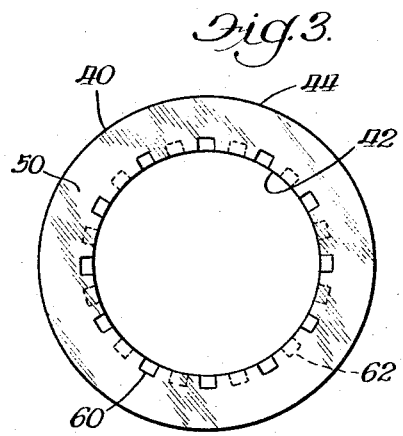
FIG. 3 is a plan view showing the seal structure in accordance with this invention.

A pair of depressions or grooves 30 extend radially into the inner annular face of the outer race ring 12 and an opopsitely disposed pair of grooves 32 extend radially into the outer face of inner race ring 15. The grooves in each race ring have an inner wall 35 and an outer wall 37. Sealing rings 40 (FIG. 3), are positioned within these depressions or grooves. The outer peripheral or annular edge 44 is pressed for an interference fit into the grooves 30 in the outer race ring 12. This interference fit maintains the rings 40 in position and resists their axial displacement by foreign material. In this position, the inner annular edge 42 is in close running fit with the grooves 32 and provides an effective labyrinth seal between the running surface provided by grooves 32 in the inner race ring 15 and sealing rings 40 to effectively keep dirt and foreign matter out of the raceway. This arrangement at the same time serves as a lubricant seal to keep lubricants within the bearing assembly.

Sealing ring 40 is relatively thin with respect to its radial cross-section and is made of a rigid but slightly resilient material, for example, nylon, so that it can be flexed and inserted into grooves 30 and 32 after the bearing assembly has been completed. The outer peripheral edge 44 and inner annular edge 42 define the directly opposing radial faces 50 of the ring 40. The inner annular edge 42 also defines the bore of the seal.

In one particular embodiment of the invention, indentations or relieved portions 60 are spaced at 30 degree intervals around one face 50 of the ring and open into the annular edge 42 or the bore thereof. On the opposing face 50 similar indentations 62 are spaced 15 degrees out-of-phase with the indentations 60 but at the same 30 degree interval.

Figure 4:
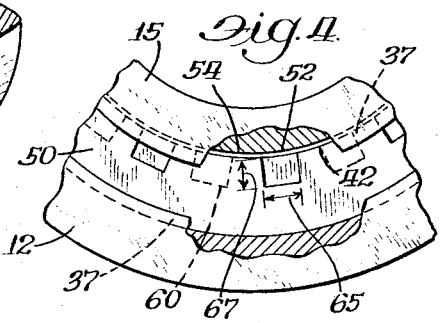
FIG. 4 is a front elevation partially in cross-section of a portion of the roller bearing assembly and seal structure of FIG. 1.

In operation, as the lubricant is inserted into the raceway of the bearing structure 10 through lubrication apertures 28, a re-lubrication pressure is built up in the raceway around the anti-friction elements. Initially, this pressure acts to displace the seal 40 axially and outwardly as seen by the position of seal 40′, in FIG. 2. For illustrative purposes, seal 40″ (FIG. 2) is shown to be in a position before re-lubrication pressure is built up in the raceway. This outward movement of the seal 40 presses the face 50 against the outer wall 37 of the grooves 30 and 32. Normally, the flat face 50 of the rings 40 would form a seal with the wall 37 and permit the re-lubrication pressure to continue to build up until the seal is blown from the bearing. The indentations 60, however, extend at least some amount above the outer wall 37 of the grooves 30 and 32 (FIG. 4) and provide passages between the walls of the grooves and the face of the sealing ring thereby preventing an effective seal between the face 50 and the wall 37. Therefore, as the re-lubricating pressure increases, for instance to about 150 p.s.i., the lubricant bleeds through the opening 52 between the annular edge 42 of the seal and the bottom 54 of the groove 32 as indicated by the arrow 55 (FIG. 2) and out the passages formed by the indentations. This bleeding action vents the raceway area, i.e., that area surrounding the anti-friction element, to relieve the internal pressure surrounding the element and prevents displacing or "blowing" of the seal 40. The opening 52 exists because the radial dimension of the face 50 of the seal 40 is less than the radial dimension between the periphery of the inner race ring 15 and the outer race ring 12 measured between the grooves 30 and 32, and with the outer periphery 44 of the seal in an interference fit with groove 30 there is a clearance 52 between the inner annular edge 42 and the groove 32.

In laying out the indentations 60, it is important that the dimension of the width or opening 65 (FIG. 4) of the indentations is not too great. For example, with the indentations 60 spaced every 30 degrees the width 65 did not substantially exceed the length or radial extension 67. This is necessary because if the width were too great it would weaken the seal structure and the re-lubricating pressure would cause the walls of the indentations to collapse against the outer wall 37 of the grooves to form a seal thereby defeating the purpose of the indentations. In addition, the relieved area or indentations must be of sufficient number to permit the seal to vent at, for instance, 150 p.s.i., and at about the same rate as the incoming lubricant.

The indentations are formed on both sides of the seal 40 to provide manufacturing tolerances and to expedite the assembly of the ring into the bearing during production. It should be clear that the ring would function quite properly with the indentations 60 only on one face of the ring, providing the ring was inserted with that face directly oposing the outer wall 37 of the grooves 30 and 32.

Figure 5:
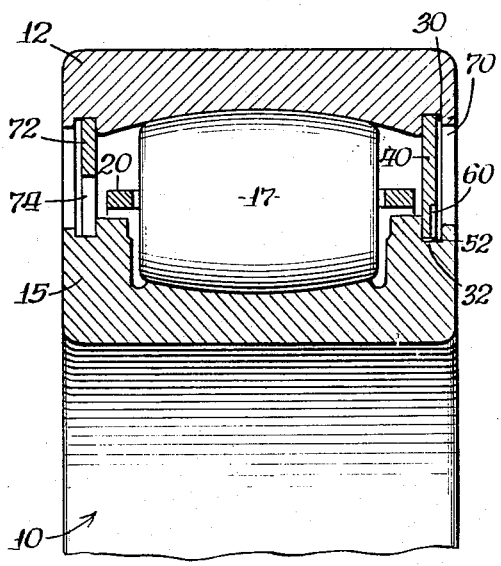
FIG. 5 is a fragmentary cross-sectional view of an alternate arrangement for lubricating a bearing with only one seal.

Another application of the sealing arrangement of the bearing can be seen in FIG. 5. In most respects, the structure therein shown is the same as in the embodiment of FIGS. 1 and 2 and the same reference numerals are applied to like parts. The difference in the two applications is that only the axial end 70 of the bearing structure is sealed by the ring 40. A snap ring 72 is fit into the grooves 30 and 32 of the opposite axial end structure of the bearing, to keep the outer and inner races aligned and prevent the bearings from being displaced from the raceway. The snap ring 72 does not act as a seal, and it exposes an opening 74 to the anti-fritcion elements. The unsealed end is mounted in the housing (not shown) and the bearing is re-lubricated by forcing lubricant into the housing and then into the bearing raceway through the opening 74. The venting action of the seal 40 is the same as previously described.

An actual physical embodiment of this invention which operated very satisfactorily included the following dimensions, and these are listed herein merely by way of an illustrative example, which, of course, is not intended to limit the invention in any manner.

|  | Inches |
|---|---|
| Groove 30: | |
|   Radial dimension (in diameter) | 3.090 |
|   Axial dimension | .048 |
| Groove 32: | |
|   Radial dimension (in diameter) | 2.254 |
|   Axial dimension | .043 |
| Seal 40: | |
|   Radial dimension, outer diameter | 3.090 |
|   Bore (in diameter) | 2.310 |
|   Axial dimension | .031 |
|   Indentations 60 | ---- |
|   Radial dimensions 67 | .125 |
|   Width 65 | .125 |
| Dimension of the outer race 12 outboard the seal 40, i.e., wall 37 of groove 30 (in diameter) | 2.985 |
| Dimension of the inner race 15 outboard the seal 40, i.e., wall 37 of groove 32 (in diameter) | 2.405 |
| Dimension between the periphery of the outer race 12 and inner race 15 measured between the grooves 30 and 32 | .418 |
| Dimension of radial face 50 of seal 40 | .390 |
| Radial clearance between the peripheries of the seal and the grooves | .028 |
| Axial clearance between the seal and walls 35 and 37 of the grooves: | |
|   Groove 30 | .017 |
|   Groove 32 | .012 |

What has been described, therefore, is an improved seal for an anti-friction bearing assembly that vents re-lubrication pressures from the raceway of the bearing assembly during inservice lubrication of the bearings.

I claim:

1. In a pair of relatively rotatable concentric members having corresponding seal retaining grooves and an annular lubricant-holding space between the members that can be re-lubricated while in use, a seal comprising a substantially flat annular sealing ring positioned and retained in the corresponding seal retaining grooves in the rotatable members and having outer and inner annular edges and a radial face defined thereby, said ring having spaced indentations on at least one radial face thereof opening to one of said annular edges, and said spaced indentations providing passages between the walls of the seal retaining grooves and said sealing ring is pressed against a corresponding wall of each such groove by internal pressure in the annular lubricant-holding space during re-lubrication, said spaced indentations each being radially dimensioned to extend beyond the adjacent wall of a groove in a rotatable member and having a circumferential width to maintain the corresponding passage open at the indentation with increased internal oil pressure during a re-lubrication operation, so that lubricant may bleed around said sealing ring and through the passages at said indentations to relieve internal pressure in a lubricant holding space for such an installation of the seal.

2. In a pair of relatively rotatable inner and outer members having an annular lubricant-holding space therebetween that can be re-lubricated while in use, a sealing device including in combination, a first annular groove in at least one axial end portion of the outer member, a second annular groove in a corresponding end portion of the inner member, each of said grooves having inner and outer walls in an axial direction, a substantially flat annular sealing ring having outer and inner annular edges and a radial face defined thereby, said ring being maintained in said inner and outer members by said outer and inner annular edges extending between said grooves in corresponding end portions of the inner and outer members to form a seal in at least one axial end portion to retain lubricant in the annular lubricant-holding space thereof, venting means including a baffle arrangement between said outer wall and said radial face, with increased internal pressure in the annular lubricant-holding chamber during a re-lubricating operation displacing said ring and said face thereof axially and outwardly against said outer walls of said grooves, and with said venting means allowing the lubricant to bleed around said seal to relieve the internal pressures in the lubricant-holding space.

3. An anti-friction bearing having an outer race unit and an inner race unit adapted to rotate freely relative to one another and having means for re-lubrication of the anti-friction elements during service, including in combination, an annular groove in at least one axial end portion of the outer race unit, an annular groove in a corresponding end portion of the inner race unit, each of said grooves having inner and outer walls, a substantially flat annular sealing ring having outer and inner annular edges and a radial face defined thereby, said ring being maintained in said inner and outer races by said outer and inner annular edges extending between said grooves in corresponding end portions of said race units to form a seal in at least one axial end of the bearing to retain lubricant at the anti-friction elements thereof, spaced indentations on said ring face, with increased internal pressure at the anti-friction elements when re-lubricating displacing said ring and said face thereof axially and outwardly against said outer walls of said grooves, and each said spaced indentation providing a passage between said outer walls and said ring face thereby allowing the lubricant to bleed around said seal and through said passage to relieve the internal pressures at the anti-friction elements and prevent a blowing out of said seal from said annular grooves.

4. In an anti-friction bearing having an outer race unit and an inner race unit adapted to rotate freely relative to one another and having one axial end of the bearing unsealed to permit re-lubrication of the anti-friction elements in the raceway during service, said race rings providing a raceway therebetween and having anti-friction elements therein, a seal retaining annular groove in a corresponding axial end portion of the inner and of outer race units, with each of said grooves having outer and inner walls, the means for allowing relubrication of the bearing in service while retaining sealing therefor, said means comprising a substantially flat annular sealing ring having outer and inner annular edges and a radial face defined thereby, said ring being positioned and retained in said seal retaining grooves to form a seal at the axial end of the bearing to retain lubricant in the raceway thereof, said radial face having spaced indentations opening to one of said annular edges and each spaced indentation providing a passage between the adjacent wall of the seal-retaining groove and said sealing ring when the latter is pressed against the corresponding groove walls by internal oil pressure at the anti-friction elements during relubrication, each said indentation having a radial dimension such as to extend beyond the wall of the groove against which it is pressed and having a circumferential width to maintain that passage open with increased oil pressure during the re-lubrication operation so that the lubricant may bleed around said sealing ring and through the passages at said indentations to relieve the internal pressure in the raceway of the bearing.

5. An anti-friction bearing having an outer race unit and an inner race unit adapted to rotate freely relative to one another and having lubricant holes in one race unit for re-lubrication of the anti-friction elements in the raceway during service, including in combination, first and second seal retaining annular grooves in corresponding end portions of the inner and outer race units, each of said grooves having inner and outer walls, a substantially flat annular sealing ring having outer and inner annular edges and first and second radial faces defined thereby, said ring being adapted to be received in said seal retaining grooves to form a seal in one axial end of the bearing to retain lubricant at the raceway thereof, said first face having first spaced indentations opening to one of said annular edges, said second face having second spaced indentations spaced out of phase with said first indentations and opening to said one of said annular edges, said spaced indentations of one of said faces each providing a passage between the walls of the seal retaining grooves and said sealing ring when the same is pressed against the groove walls by internal pressure at the anti-friction elements during re-lubrication, said indentations each being radially dimensioned to extend above the walls of the seal retaining grooves and having a circumferential width to maintain the passages open with increased oil pressure during the relubrication operation, so that the lubricant may bleed around said sealing ring and through the passages at said indentations to relieve the internal pressure in the raceway of the bearing.

References Cited

UNITED STATES PATENTS

| | | | |
|---|---|---|---|
| 1,505,075 | 8/1924 | Rhinevault | 308—187.1 |
| 2,604,852 | 7/1952 | Baker | 277—53 |
| 2,708,610 | 5/1955 | Donaldson et al. | 308—162 |
| 3,208,779 | 9/1965 | Sullivan | 277—29 |

MARTIN P. SCHWADRON, *Primary Examiner.*

FRANK SUSKO, *Examiner.*